(12) United States Patent
Hayashi et al.

(10) Patent No.: US 10,291,549 B2
(45) Date of Patent: May 14, 2019

(54) PARAMETER DETERMINATION APPARATUS, PARAMETER DETERMINATION METHOD AND PROGRAM

(71) Applicant: NEC Corporation, Tokyo (JP)

(72) Inventors: Yuki Hayashi, Tokyo (JP); Jun Suzuki, Tokyo (JP); Masaki Kan, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/559,938

(22) PCT Filed: Mar. 17, 2016

(86) PCT No.: PCT/JP2016/058470
§ 371 (c)(1),
(2) Date: Sep. 20, 2017

(87) PCT Pub. No.: WO2016/152712
PCT Pub. Date: Sep. 29, 2016

(65) Prior Publication Data
US 2018/0077085 A1    Mar. 15, 2018

(30) Foreign Application Priority Data
Mar. 20, 2015    (JP) .................................. 2015-057989

(51) Int. Cl.
*H04L 12/26*    (2006.01)
*H04L 12/24*    (2006.01)
*H04L 12/911*    (2013.01)

(52) U.S. Cl.
CPC ............ *H04L 47/829* (2013.01); *H04L 41/12* (2013.01); *H04L 43/0876* (2013.01); *H04L 47/828* (2013.01)

(58) Field of Classification Search
CPC ........... H04W 4/33; H04W 4/08; H04W 4/70; H04L 47/828; H04L 47/829; H04L 41/12; H04L 43/0876
See application file for complete search history.

(56) References Cited

U.S. PATENT DOCUMENTS

| 7,496,039 B2 | 2/2009 | Yamada et al. |
| 9,450,817 B1 * | 9/2016 | Bahadur ................. H04L 45/64 |

(Continued)

FOREIGN PATENT DOCUMENTS

| JP | 07-245626 | 9/1995 |
| JP | 2001-339404 | 12/2001 |

(Continued)

OTHER PUBLICATIONS

International Search Report, PCT/JP2016/058470, dated May 31, 2016.

(Continued)

*Primary Examiner* — Paul H Masur
(74) *Attorney, Agent, or Firm* — Young & Thompson

(57) ABSTRACT

A parameter determination apparatus is provided with: an input/output I/F configured to receive topology information representing connections between nodes included in a communication system, and node pair information indicating node pairs that communicate with each other; a parameter determination unit configured to simultaneously determine, based on the topology information and the node pair information, a group formed of 1 or more node pairs and a transmission rate to be assigned to the group; and a parameter setting unit configured to give notification of the group and the transmission rate to the nodes included in the communication system. In this way, network utilization efficiency is increased.

15 Claims, 15 Drawing Sheets

(56) References Cited

U.S. PATENT DOCUMENTS

| | | | |
|---|---|---|---|
| 2006/0050635 A1 | 3/2006 | Yamada et al. | |
| 2011/0292788 A1 | 12/2011 | Tsuchiya | |
| 2014/0241354 A1* | 8/2014 | Shuman | H04L 67/16 370/390 |
| 2015/0263987 A1* | 9/2015 | Klein | H04L 29/08 709/226 |
| 2016/0149814 A1* | 5/2016 | Lu | H04L 43/0894 370/235 |
| 2016/0149831 A1* | 5/2016 | Lu | H04L 47/788 370/229 |
| 2016/0156513 A1* | 6/2016 | Zhang | H04W 4/70 709/220 |
| 2016/0157043 A1* | 6/2016 | Li | H04W 4/70 370/254 |
| 2016/0262038 A1* | 9/2016 | Dunn | H04L 41/0893 |
| 2018/0176733 A1* | 6/2018 | Patel | G01S 11/06 |

FOREIGN PATENT DOCUMENTS

| | | |
|---|---|---|
| JP | 2006-074600 | 3/2006 |
| JP | 2009-296136 | 12/2009 |
| JP | 2011-249979 | 12/2011 |

OTHER PUBLICATIONS

Hiroshi Emina, "Split Connection Methods with Flow Control for Session-based Group-oriented Communication", IEICE Technical Report, Feb. 24, 2011 (Feb. 24, 2011), vol. 110, No. 448 pp. 723 to 728.

* cited by examiner

FIG. 5

| | |
|---|---|
| $rate^{ig}$ | TRANSMISSION RATE GIVEN TO GROUP g OF NODE i |
| $valid^{ig}$ | FLAG INDICATING WHETHER OR NOT GROUP g OF NODE i IS USED |
| $G_i$ | NUMBER OF GROUPS FOR NODE i |
| $rate_{min}$ | MINIMUM VALUE OF TRANSMISSION RATE |
| $tree^{ig}$ | Tree ARRAY CONFIGURED BY NODE i AND DESTINATION NODE REFERRING TO GROUP g OF NODE i (GIVEN) |
| $tree^{ig}_e$ | e-TH ELEMENT OF ABOVEMENTIONED ARRAY (GIVEN) |
| $leaf^{ig}$ | DESTINATION NODE ARRAY REFERRING TO GROUP g OF NODE i (GIVEN) |
| $leaf^{ig}_n$ | n-TH ELEMENT OF ABOVEMENTIONED ARRAY (GIVEN) |
| $Dest^i$ | DESTINATION NODE ARRAY OF NODE i (GIVEN) |
| $R$ | MINIMUM TRANSMISSION RATE (GIVEN) |
| $N_g$ | MAXIMUM NUMBER OF TRANSMISSION RATE CONTROL UNITS OF NODE (GIVEN) |
| $BW_e$ | LINK CAPACITY ASSIGNED TO LINK e OF NETWORK (GIVEN) |
| $E$ | TOTAL LINKS (GIVEN) |
| $N$ | TOTAL NODES (GIVEN) |
| $\delta_1, \delta_2$ | MINUTE VALUES OF LEVEL THAT IS NEGLIGIBLE WITH REGARD TO RATE (GIVEN) |

CAPACITY OF EACH LINK:1000[Mbps]
TRANSMISSION RATE MINIMUM VALUE :250[Mbps]

FIG. 11

| TRANSMITTING NODE | RECEIVING NODE |
|---|---|
| 1 | 2 |
| 1 | 4 |
| 1 | 5 |
| 2 | 4 |
| 2 | 5 |

FIG. 12

|  |  | \multicolumn{7}{c}{LINK NUMBER e} |
|---|---|---|---|---|---|---|---|---|
|  |  | 1 | 2 | 3 | 4 | 5 | 6 | 7 |
| ARRAY OF LINKS TO BE USED | $Tree^{11}$ | 1 | 1 | 0 | 0 | 0 | 0 | 0 |
| | $Tree^{12}$ | 1 | 0 | 1 | 0 | 0 | 0 | 0 |
| | $Tree^{13}$ | 1 | 0 | 0 | 1 | 0 | 0 | 1 |
| | $Tree^{14}$ | 1 | 0 | 0 | 0 | 1 | 0 | 1 |
| | $Tree^{15}$ | 1 | 0 | 0 | 0 | 0 | 1 | 1 |
| | $Tree^{16}$ | 1 | 1 | 1 | 0 | 0 | 0 | 0 |
| | $Tree^{17}$ | 1 | 1 | 0 | 1 | 0 | 0 | 1 |
| | $Tree^{18}$ | 1 | 1 | 0 | 0 | 1 | 0 | 1 |
| | ... | | | | | | | |

FIG. 13

| | | DESTINATION NODE | | | | | |
|---|---|---|---|---|---|---|---|
| | | 1 | 2 | 3 | 4 | 5 | 6 |
| DESTINATION NODE ARRAY OF Tree | $Leaf^{11}$ | 0 | 1 | 0 | 0 | 0 | 0 |
| | $Leaf^{12}$ | 0 | 0 | 1 | 0 | 0 | 0 |
| | $Leaf^{13}$ | 0 | 0 | 0 | 1 | 0 | 0 |
| | $Leaf^{14}$ | 0 | 0 | 0 | 0 | 1 | 0 |
| | $Leaf^{15}$ | 0 | 0 | 0 | 0 | 0 | 1 |
| | $Leaf^{16}$ | 0 | 1 | 1 | 0 | 0 | 0 |
| | $Leaf^{17}$ | 0 | 1 | 0 | 1 | 0 | 0 |
| | $Leaf^{18}$ | 0 | 1 | 0 | 0 | 1 | 0 |
| | ... | | | | | | |

FIG. 14

|  |  | DESTINATION NODE | | | | | |
|---|---|---|---|---|---|---|---|
|  |  | 1 | 2 | 3 | 4 | 5 | 6 |
| DESTINATION OF NODE i | $Dest^1$ | 0 | 1 | 0 | 1 | 1 | 0 |
|  | $Dest^2$ | 0 | 0 | 0 | 1 | 1 | 0 |
|  | $Dest^3$ | 0 | 0 | 0 | 0 | 0 | 0 |
|  | $Dest^4$ | 0 | 0 | 0 | 0 | 0 | 0 |
|  | $Dest^5$ | 0 | 0 | 0 | 0 | 0 | 0 |
|  | $Dest^6$ | 0 | 0 | 0 | 0 | 0 | 0 |

FIG. 15

| TRANSMITTING NODE | TRANSMITTING NODE PAIR GROUP | TRANSMISSION RATE [Mbps] |
|---|---|---|
| 1 | {2} | 500 |
| 1 | {4,5} | 500 |
| 2 | {4,5} | 500 |

PARAMETER DETERMINATION APPARATUS, PARAMETER DETERMINATION METHOD AND PROGRAM

REFERENCE TO RELATED APPLICATION

The present invention is based upon and claims the benefit of the priority of Japanese patent application No. 2015-057989, filed on Mar. 20, 2015, the disclosures of which are incorporated herein in their entirety by reference thereto.

TECHNICAL FIELD

The present invention relates to a parameter determination apparatus, a parameter determination method and a program, and in particular relates to a parameter determination apparatus, a parameter determination method and a program, which determine parameters of a transmission control unit provided at a node that performs communication.

BACKGROUND

Industrial embedded systems requiring real-time control are being widely introduced, such as factory automation (FA) systems and broadcast video systems. Since these industrial embedded systems require real-time control between embedded CPUs (Central Processing Unit) that are geographically dispersed, real-time communication is realized using dedicated communication protocols and dedicated field buses.

However, along with lower costs and wider bandwidth for Ethernet (registered trademark), which is widely used in communication networks, systems realizing communication networks in industrial embedded systems by Ethernet (registered trademark) are becoming common.

"Communication delay guarantee" for realizing real-time control is cited as a requirement of a network in an industrial embedded system. In order to provide a guarantee with regard to communication delay in Ethernet (registered trademark), an End-to-End bandwidth reservation system is described in Patent Literatures (PTLs) 1 and 2.

In the systems described in Patent Literatures 1 and 2, bandwidth reservation is carried out by determining transmission rate for each node pair so as to maximize the utilization rate of network bandwidth, and setting the determined transmission rate in a rate control unit corresponding to a destination node.

[PTL 1]
Japanese Patent Kokai Publication No. JP-H07-245626A
[PTL 2]
Japanese Patent Kokai Publication No. JP2006-074600A

SUMMARY

The entire disclosed content of the abovementioned Patent Literatures 1 and 2 is incorporated herein by reference thereto. The following analysis is given according to the present inventor.

In the technology described in the abovementioned Patent Literatures 1 and 2, after each node pair has made bandwidth reservation, a packet is not always transmitted to in a network. Therefore, according to the technology described in the abovementioned Patent Literatures 1 and 2, in a case where a node pair that has made a bandwidth reservation does not transmit, wastage occurs with regard to that reserved bandwidth. Giving consideration to this situation, when plural node pairs are able to use one transmission rate control unit, it is possible to raise network utilization efficiency. That is, in a communication system in which plural nodes perform communication, there are cases where grouping transmission rates of respective node pairs raises network utilization efficiency.

However, in the technology described in the abovementioned Patent Literatures 1 and 2, such cases are not considered.

In the technology described in Patent Literatures 1 and 2, transmission rate is determined on the assumption that the number of transmission rate control units is greater than or equal to the number of transmission node pairs. However, in a case where there is a limitation in implementation in software, hardware or the like, there may be cases where it is difficult to have an implementation in which the number of transmission rate control units is greater than or equal to the number of transmission node pairs. In such cases, it is necessary to group the transmission rates of node pairs to make a determination.

However, in the technology described in the abovementioned Patent Literatures 1 and 2, there is a problem in that consideration is not given to where there is a limitation to the number of transmission rate control units.

Accordingly, there is a problem with regard to increasing network utilization efficiency. It is an object of the present invention to provide a parameter determination apparatus, a parameter determination method and a program, which contribute to solving this problem.

According to a first aspect of the present invention, a parameter determination apparatus includes: an input/output I/F (Interface) configured to receive topology information representing connections between nodes included in a communication system and node pair information indicating node pairs that communicate with each other; a parameter determination unit configured to simultaneously determine, based on the topology information and the node pair information, a group formed of 1 or more of the node pairs and a transmission rate to be assigned to the group; and a parameter setting unit configured to give notification of the group and the transmission rate to the nodes included in the communication system.

According to a second aspect of the present invention, a parameter determination method performed in a parameter determination apparatus, includes: receiving topology information representing connections between nodes included in a communication system and node pair information indicating node pairs that communicate with each other; simultaneously determining, based on the topology information and the node pair information, a group formed of 1 or more of the node pairs and a transmission rate to be assigned to the group; and giving notification of the group and the transmission rate to node(s) included in the communication system.

According to a third aspect of the present invention, a program executes on a computer: a process of receiving topology information representing connections between nodes included in a communication system and node pair information indicating node pairs that communicate with each other; a process of simultaneously determining, based on the topology information and the node pair information, a group formed of 1 or more of the node pairs and a transmission rate to be assigned to the group; and a process of giving notification of the group and the transmission rate to node(s) included in the communication system. It is to be noted that the program may be provided as a program product recorded in a non-transitory computer-readable storage medium.

According to the parameter determination apparatus, the parameter determination method and the program according to the present invention, it is possible to raise network utilization efficiency.

BRIEF DESCRIPTION OF THE DRAWINGS

FIG. 5 is a table showing content of variables used when determining a parameter.

FIG. 11 is a diagram showing an example of node pair information.

FIG. 12 is a diagram showing an example of content of a "tree" array.

FIG. 13 is a diagram showing an example of content of a "leaf" array.

FIG. 14 is a diagram showing an example of content of a "Dest" array.

FIG. 15 is a diagram showing an example of calculation results of transmission rate and transmission node pair group.

MODES

Figure 1:
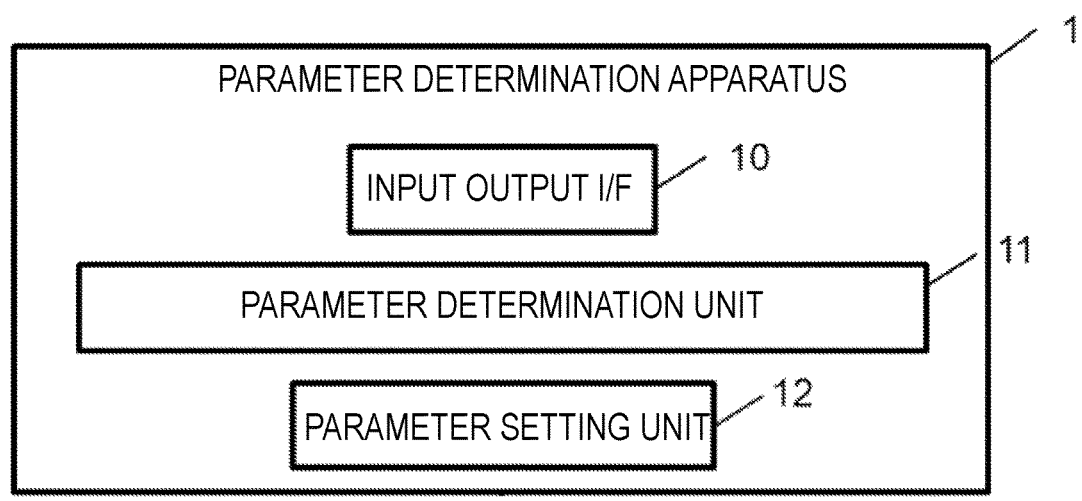
FIG. 1 is a block diagram showing an example of a configuration of a parameter determination apparatus according to an example embodiment.

First, a description is given concerning an outline of an example embodiment. It is to be noted that reference symbols in the drawings attached to this outline are examples for the purpose of aiding understanding, and are not intended to limit the present invention to modes illustrated in the drawings.

Figure 10:
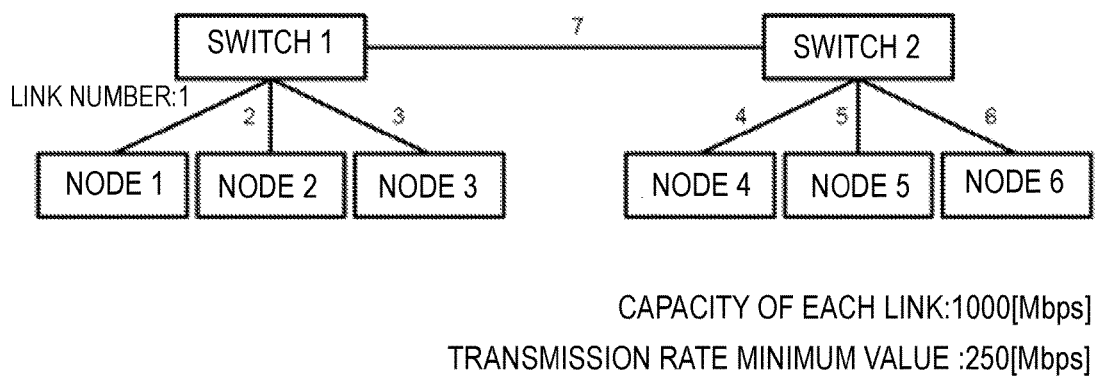
FIG. 10 is a diagram showing an example of a configuration of connections between nodes (network topology information).

FIG. 1 is a block diagram showing an example of a configuration of a parameter determination apparatus 1 according to the example embodiment. FIG. 10 is a diagram showing an example of a connection configuration of a communication system provided with nodes 1 to 6. FIG. 11 is a diagram showing an example of node pairs that perform mutual communication.

Referring to FIG. 1, the parameter determination apparatus 1 is provided with: an input/output I/F (interface) 10 that is configured to receive topology information representing connections (for example, FIG. 10) between nodes included in the communication system and node pair information indicating node pairs (for example, FIG. 11) that communicate with each other; a parameter determination unit 11 that is configured to simultaneously determine, based on the topology information and the node pair information, a group formed of 1 or more node pairs and a transmission rate assigned to the group (for example, FIG. 15); and a parameter setting unit 12 that is configured to give notification of the determined group and transmission rate to the nodes included in the communication system.

According to the example embodiment, it is possible to raise network utilization efficiency. A reason for this is that it is possible to take into account the time in which a node is not communicating, and determine transmission rate so that as many node pairs as possible are grouped.

First Example Embodiment

Next, a detailed description is given concerning a parameter determination apparatus according to a first example embodiment, making reference to the drawings.

[Configuration]

Figure 2:
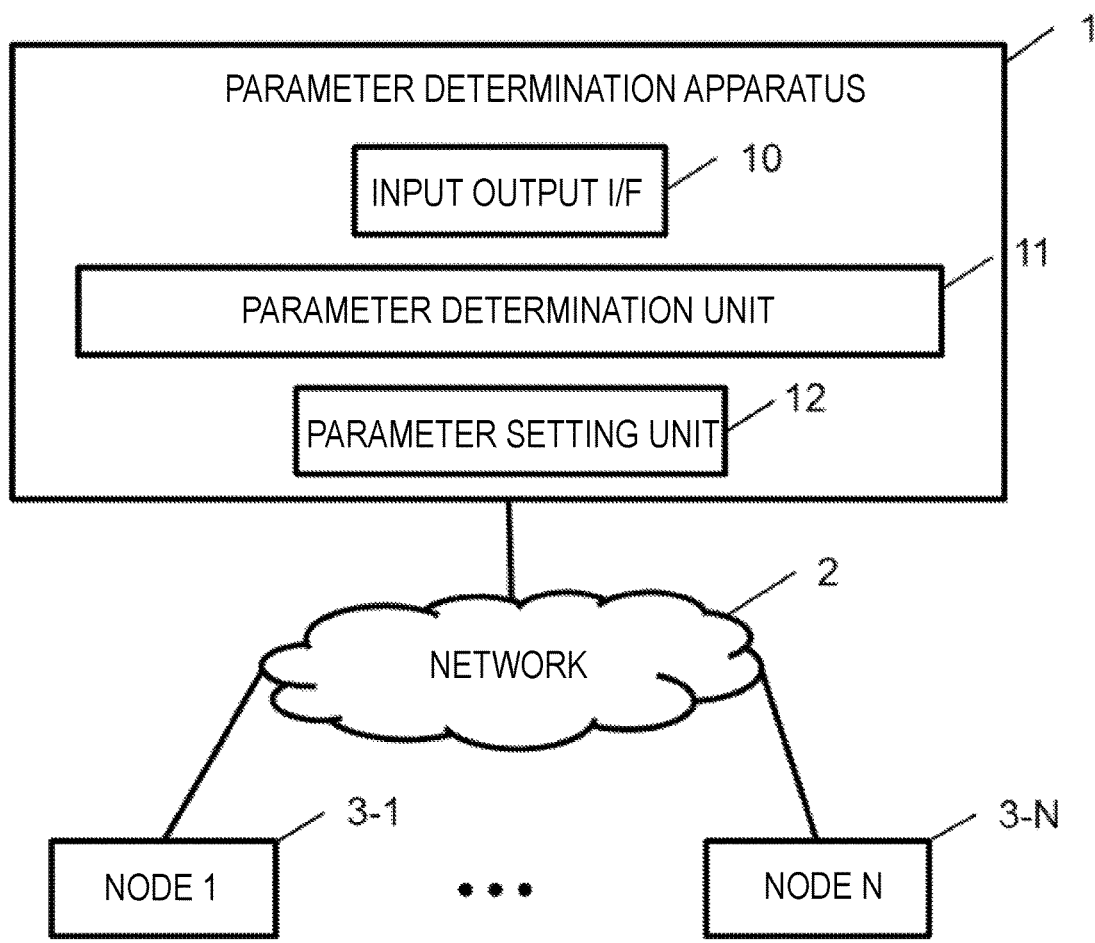
FIG. 2 is a block diagram showing an example of a configuration of a communication system provided with a parameter determination apparatus according to a first example embodiment.

FIG. 2 is a block diagram showing an example of a configuration of a communication system provided with a parameter determination apparatus 1 according to the present example embodiment. Referring to FIG. 2, the communication system is provided with nodes 3-1 to 3-N that transmit and receive data, the parameter determination apparatus 1 that determines parameters of transmission control units provided in nodes 3-1 to 3-N, and a network 2 that connects nodes 3-1 to 3-N and the parameter determination apparatus 1.

The parameter determination apparatus 1 is provided with an input output I/F (Interface) 10 by which network topology and transmitting and receiving node pairs are inputted and results outputted, a parameter determination unit 11 that determines transmission control unit parameters from the inputted network topology and transmitting and receiving node pairs, and a parameter setting unit 12 that sets the determined parameters in the nodes.

Figure 3:
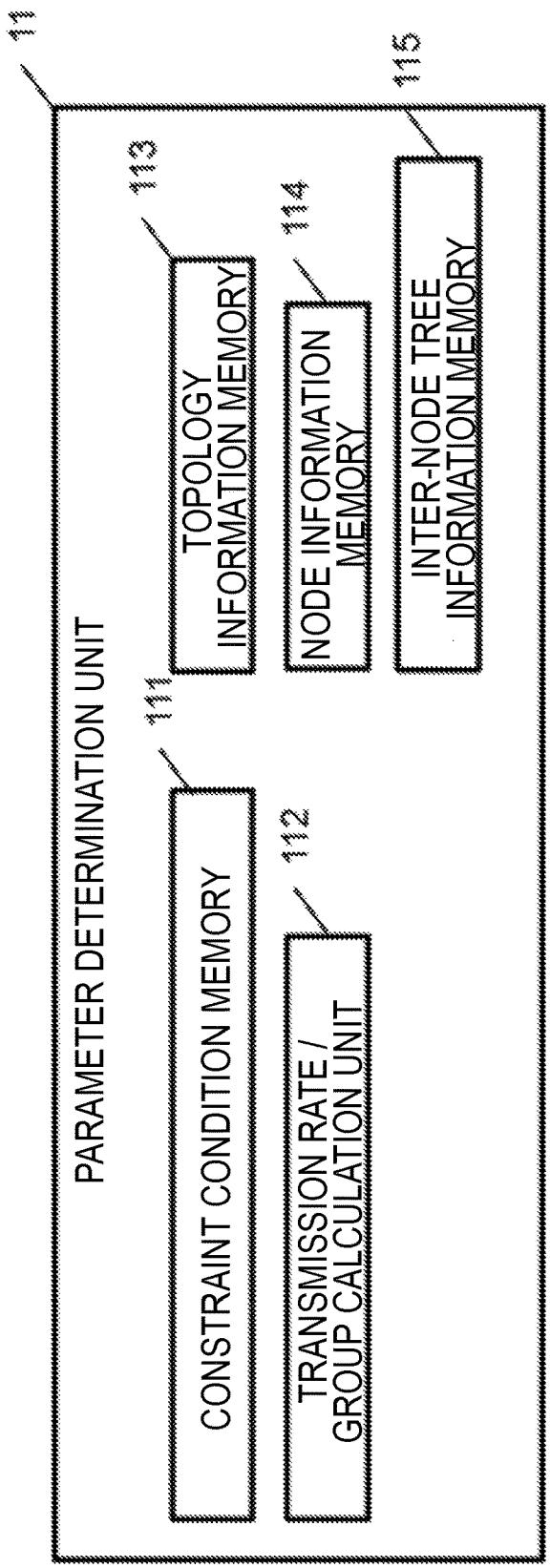
FIG. 3 is a block diagram showing an example of a configuration of a parameter determination unit of the parameter determination apparatus according to the first example embodiment.

FIG. 3 is a block diagram showing an example of a configuration of the parameter determination unit 11 of the parameter determination apparatus 1. Referring to FIG. 3, the parameter determination unit 11 is provided with a transmission rate/group calculation unit 112, a constraint condition memory 111, a topology information memory 113, a node information memory 114, and an inter-node tree information memory 115.

The transmission rate/group calculation unit 112 calculates transmission rate and communication node pair group. The constraint condition memory 111 holds the "transmission rate/group determination constraint conditions", which are constraint conditions for calculating the transmission rate and the communication node pair group. The topology information memory 113 holds network topology bandwidth information and inter-node connection information. The node information memory 114 holds information as to which node each node communicates with, and information of the transmission constraint unit within a node. The inter-node tree information memory 115 holds all paths (all patterns) of partial trees formed by nodes extracted from the network.

Figure 4:
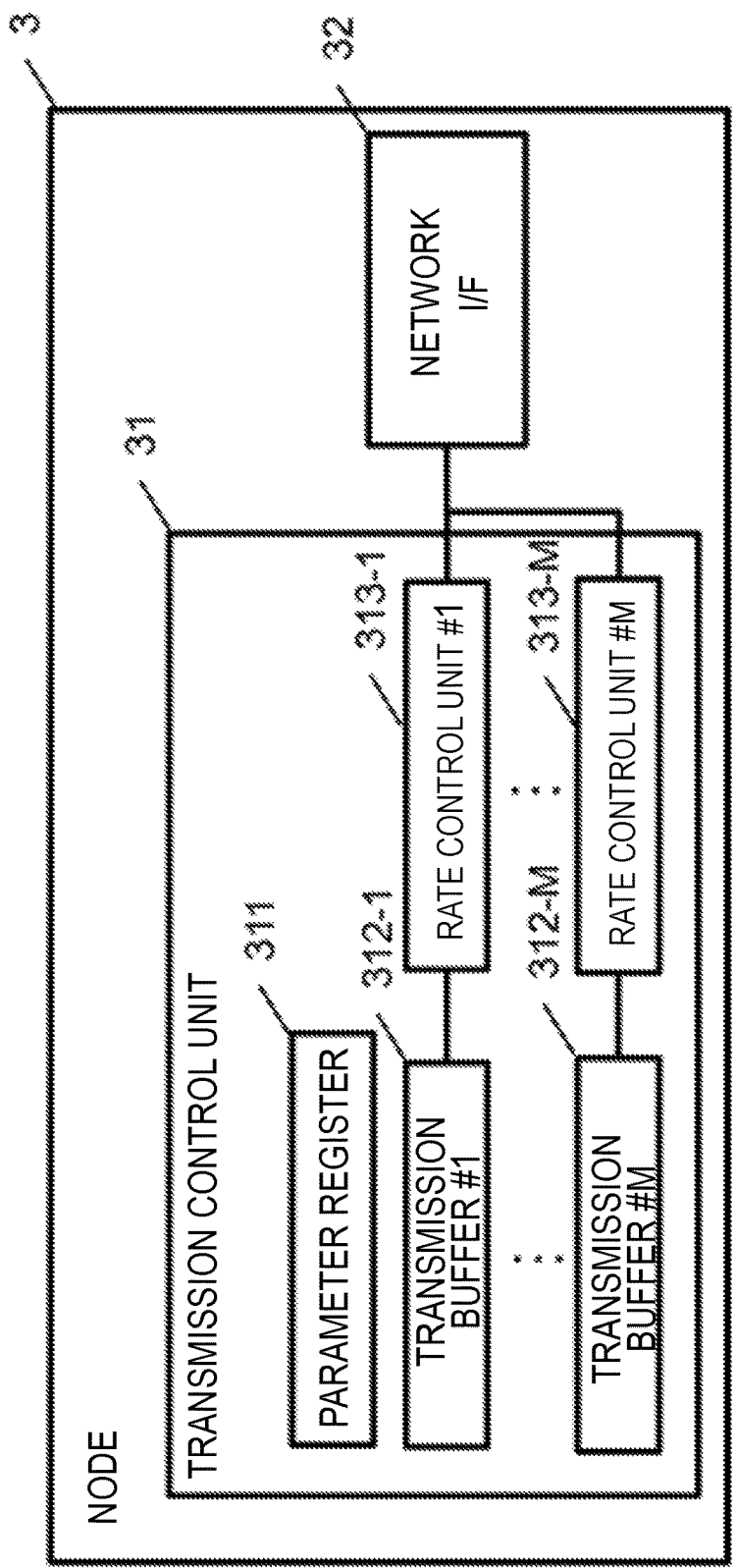
FIG. 4 is a block diagram showing an example of a configuration of a node that is a target of the parameter determination apparatus according to the first example embodiment.

FIG. 4 is a block diagram showing an example of a configuration of node 3. Referring to FIG. 4, node 3 is provided with a transmission constraint unit 31 and a network I/F 32.

The transmission control unit 31 controls transmission rate when packet transmission is performed. The network I/F 32 is an interface (I/F) for transmitting to the network 2.

The transmission control unit 31 is provided with a parameter register 31, transmission buffers 312-1 to 312-M, and rate control units 313-1 to 313-M.

The parameter register 31 holds the group and transmission rate determined by the parameter determination unit 11 of the parameter determination apparatus 1. The transmission buffers 312-1 to 312-M perform buffering of packets to be transmitted, based on group information of the parameter register 311. The rate control units #313-1 to 313-M transmit packets corresponding to transmission buffers #312-1 to 312-M based on the transmission rate of the parameter register 311.

Next, the "transmission rate/group determination constraint conditions" is described, using variables of FIG. 5. Variables with given notation in FIG. 5 are variables stored in the topology information memory 113, the node information memory 114, and the inter-node tree information memory 115, by the parameter determination unit 11. Meanwhile, items without a given notation in FIG. 5 are variables calculated by the parameter determination unit 11 in accordance with constraint conditions.

In FIG. 5, $rate^{ig}$ is the transmission rate given to a group g with respect to a node i. $valid^{ig}$ is a flag indicating whether or not group g is to be used with respect to node i. Here, where group g is used with respect to node i, the value of flag $valid^{ig}$ is taken as 1, and otherwise the value of flag $valid^{ig}$ is taken as 0. $G_i$ represents the total number of groups with respect to node i. $rate_{min}$ represents the minimum value of the transmission rate.

$tree^{ig}$ is a tree array configured by node i and a destination node referring to group g with respect to node i. $tree^{ig}_e$ is the e-th element of the array $tree^{ig}$. $leaf^{ig}$ is a destination node array making reference to group g with respect to node i. $leaf^{ig}_n$ is the n-th element of the array $leaf^{ig}$. $Dest^i$ is a destination node array of node i. R is the minimum transmission rate. $N_g$ is the maximum number of rate control units 313 provided in the transmission control unit 31 of node 3. $BW_e$ is link capacity given to link e of network 2. E is the total number of links. N is the total number of nodes. $\delta_1$ and $\delta_2$ are minute values that are negligible with respect to transmission rate.

[1] Object Function

Expression (1) is an object function for "transmission rate/group determination constraint conditions", and the transmission rate/group calculation unit 112 maximizes the object function of Expression (1). The first item of Expression (1) represents the total for all nodes/groups, of transmission rates given to the group g used, among groups g of node i. Meanwhile, the second item in Expression (1) represents the total number of groups of all nodes. The first item of Expression (1) functions so as to maximize the network utilization efficiency giving consideration to static communication, and on the other hand the second item of the Expression (1) functions so as to minimize the number of groups of each node.

$$\text{maximize} \quad \left(\sum_{i=1}^{N}\sum_{g=1}^{G} rate^{ig} * valid^{ig}\right) - \left(\sum_{i=1}^{N} \delta_1 * G_i\right) \quad (1)$$

[2] Constraint Condition 1

Expression (2) is a constraint condition that constrains the object function included in the "transmission rate/group determination constraint conditions". The left side of Expression (2) expresses the total of transmission rates of all groups of all nodes passing link e of the network. On the other hand, the right side of Expression (2) expresses the link bandwidth given to link e of the network. According to Expression (2) the total of transmission rates of flows passing the link e is less than or equal to the link bandwidth (link capacity).

$$\sum_{i=1}^{N}\sum_{g=1}^{G} rate^{ig} * valid^{ig} * tree^{ig}_e \leq BW_e \quad (\forall e \in E) \quad (2)$$

[3] Constraint Condition 2

Expression (3) is a constraint condition that constrains the object function included in the "transmission rate/group determination constraint conditions". The left side of Expression (3) shows a destination array included in all groups used by node i. Meanwhile, the right side of Expression (3) shows a destination array to which node I transmits. According to Expression (3) a group is determined so that of necessity one destination to which each node i should transmit is included.

$$\sum_{g=1}^{G} valid^{ig} * leaf^{ig} = Dest^i \quad (\forall i \in N) \quad (3)$$

[4] Constraint Condition 3

Expression (4) is a constraint condition that constrains the object function included in the "transmission rate/group determination constraint conditions". Both sides of Expression (4) express the total number of groups used by node i. According to Expression (4), the total number of groups used by respective nodes is calculated.

$$\sum_{g=1}^{G} valid^{ig} = G_i \quad (\forall i \in N) \quad (4)$$

The transmission rate/group calculation 112 calculates variable combinations so as to maximize the object function, while satisfying constraint conditions included in the "transmission rate/group determination constraint conditions". This problem can be solved as a planning problem. The transmission rate/group calculation unit 112, for example, can use an algorithm such the simplex method as the calculation method. Note that algorithms which can be used in the present invention are not limited to this.

[Operations]

Next, a detailed description is given concerning operations of the present example embodiment, making reference to flowcharts of FIG. 6 to FIG. 9, and examples shown in FIG. 10 to FIG. 15.

First, a description is given concerning operations of the input output I/F 10 of the parameter determination apparatus 1. Here, a description is given of a case where a network administrator transmits network topology information and node information, and it is desired to output node transmission rate setting and group setting.

Figure 6:
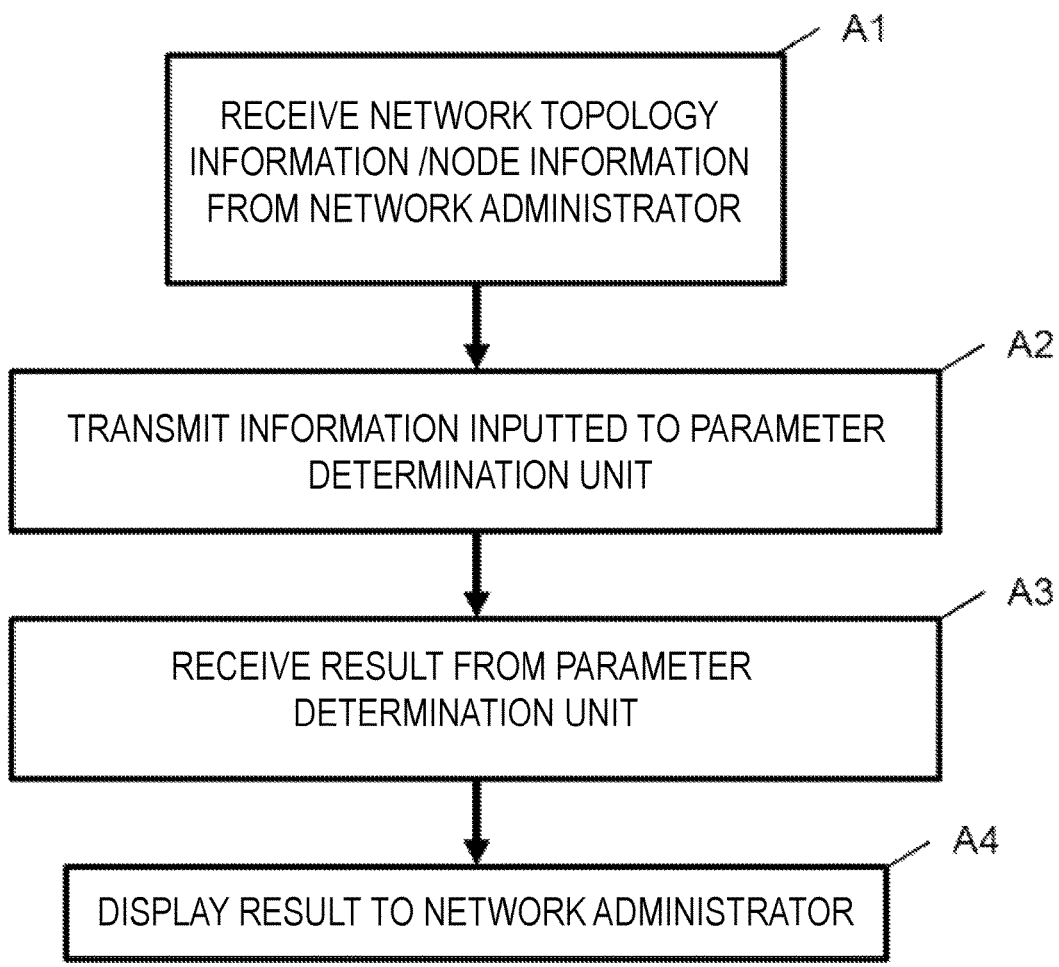
FIG. 6 is a flowchart showing an example of operations of an input-output I/F of the parameter determination apparatus according to the first example embodiment.

Referring to FIG. 6, the network administrator inputs the network topology information and node information to the input output I/F 10 (step A1). The node information at this time includes node pair information showing nodes pairs that carry out communication with each other.

Next, the input output I/F 10 that receives information transmits the inputted information to the parameter determination unit 11 (step A2).

Next, the input output I/F 10 receives a result with regard to the inputted information, from the parameter determination unit 11 (step A3). The result received from the parameter determination unit 11 includes information regarding what transmission rate is assigned to all the rate control units 313 of all nodes 3 connected to the network 2. Meanwhile, in a case of an assignment failure, the result received from the parameter determination unit 11 includes information that there has been a failure.

Next, the input output I/F 10 displays the result to the network administrator (step A4). As display methods by the input output I/F 10, several display methods may be considered, such as a GUI (Graphical User Interface). Note that in the present example embodiment there is no particular limitation with regard to display method.

Next, a description is given concerning a case where the network administrator inputs a parameter to the "transmission rate/group determination constraint conditions".

Figure 7:
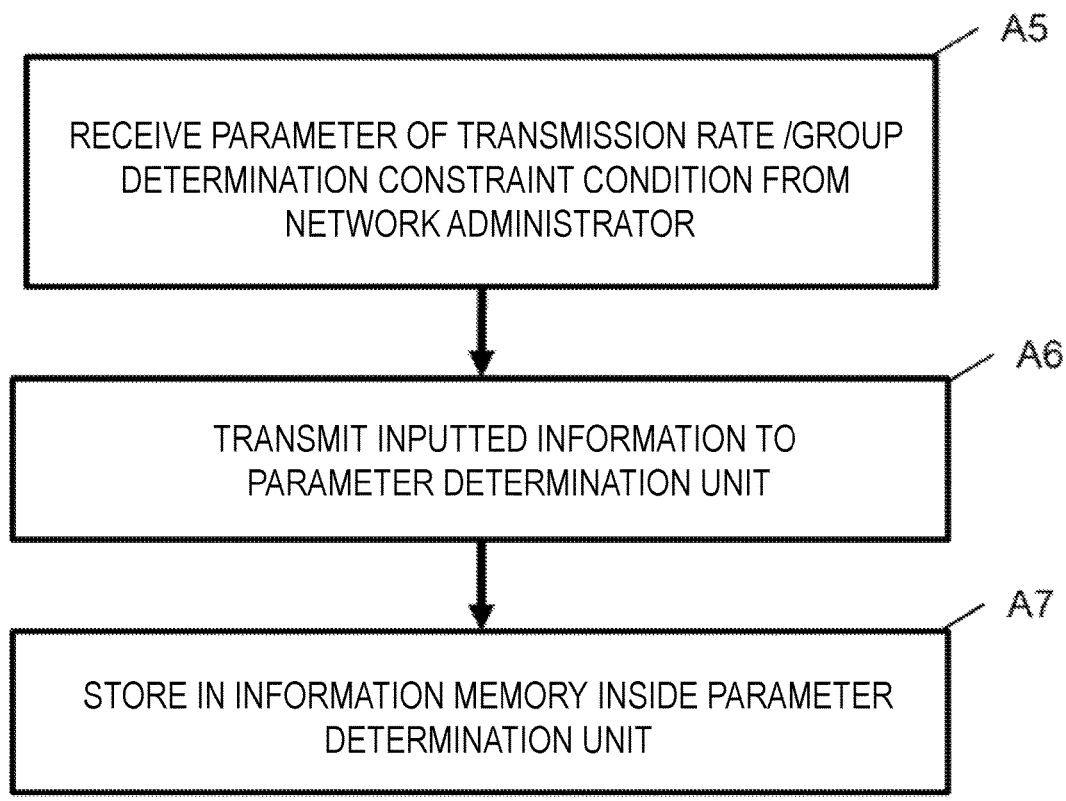
FIG. 7 is a flowchart showing an example of operations of the input-output I/F and the parameter determination unit of the parameter determination apparatus according to the first example embodiment.

Referring to FIG. 7, the input output I/F 10 receives a parameter of the "transmission rate/group determination constraint conditions", from the network administrator (step A5). This parameter is, for example, "R", "$N_g$", "$\delta_1, \delta_2$" in FIG. 5.

Next, the input output I/F 10 transmits the inputted parameter to the parameter determination unit 11 (step A6).

Next, the parameter determination unit 11 stores the parameters in respective information memories of the parameter determination unit 11 (step A7).

Next, a description is given concerning operations of the parameter determination unit 11 of the parameter determination apparatus 1.

Figure 8:
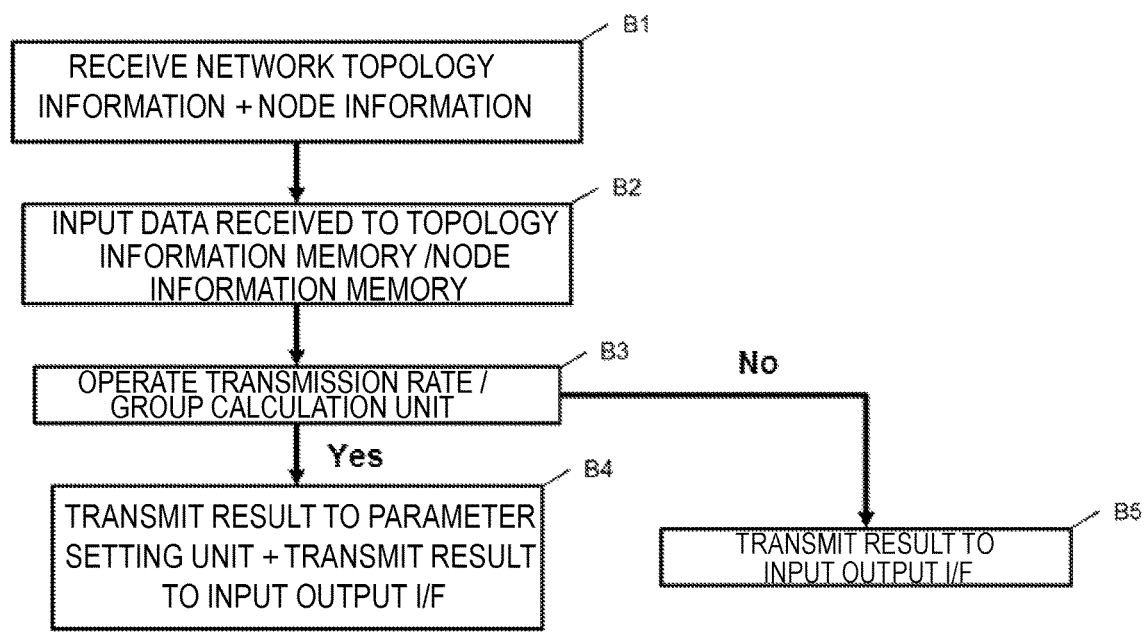
FIG. 8 is a flowchart showing an example of operations of the parameter determination unit of the parameter determination apparatus according to the first example embodiment.

Referring to FIG. 8, on receiving network topology information and node information from the input output I/F 10 (step B1), the parameter determination unit 11 inputs the received data to the topology information memory 113 and the node information memory 114 (step B2). At this time, the parameter determination unit 11 uses the information in the topology information memory 113 and the node information memory 114 to calculate a given variable in FIG. 5 used in the present example embodiment, to be stored in the topology information memory 113, the node information memory 114 and the inter-node tree information memory 115.

Next, the transmission rate/group calculation unit 112 performs calculation of the transmission rate and group (step B3). A description of details of the calculation is given below following step C1.

In a case where the calculation result is "calculation possible" (Yes in FIG. 8), the parameter determination unit 11 transmits the calculation result of the transmission rate/group calculation unit 112 to the parameter setting unit 12, and in addition transmits the result also to the input output I/F 10 (step B4).

On the other hand, in a case where the calculation result is "calculation not possible" (No in FIG. 8), the parameter determination unit 11 transmits the result to the input output I/F 10 (step B5).

Next, a description is given of details of operations of step B3 in FIG. 8.

Figure 9:
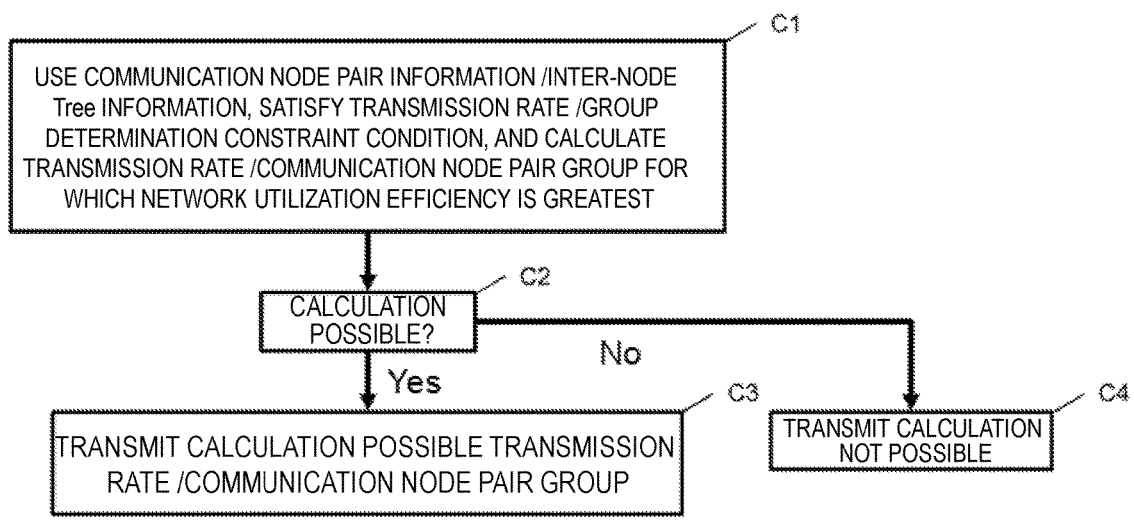
FIG. 9 is a flowchart showing an example of operations of a transmission rate/group calculation unit of the parameter determination apparatus according to the first example embodiment.

Referring to FIG. 9, on receiving a calculation command from the parameter determination unit 11, the transmission rate/group calculation unit 112 uses the topology information memory 113, the node information memory 114 and the inter-node tree information memory 115, to calculate a transmission rate/communication node pair group satisfying the constraint conditions described in the "transmission rate/group determination constraint conditions" and maximizing the object function (step C1). The transmission rate/group calculation unit 112 can use an algorithm such as the simplex method described above, as the calculation method.

Next, the transmission rate/group calculation unit 112 judges the calculation result (step C2), and in a case where calculation is possible (Yes in step C2), transmits "calculation possible", "transmission rate" and "communication node pair group" as the calculation result (step C3). On the other hand, in the case where calculation is not possible (No in step C2), the transmission rate/group calculation unit 112 transmits "calculation not possible" as the calculation result (step C4).

Here, a description is given concerning operations of the parameter determination apparatus 1 of the present example embodiment, based on the specific examples shown in FIG. 10 to FIG. 15.

Here, topology information representing connection configuration between nodes shown in FIG. 10, and node pair information representing node pairs that communicate with each other shown in FIG. 11 are inputted by the network administrator. At this time, the respective arrays of "tree", "leaf" and "Dest" of FIG. 5 are given as in FIG. 12 to FIG. 14. "$BW_e$", "E" and "N" are determined from the network topology, and "R" and "$\delta_1, \delta_2$" are determined by parameter input from the network administrator. The transmission rate/group calculation 112 uses this information to calculate transmission rate and transmission node pair group so as to maximize the object function of the "transmission rate/group determination constraint conditions". In the case of this example, a result as in FIG. 15 is obtained, for example.

In a case where there are a plurality of optimal solutions, which optimal solution is outputted as a result depends on the algorithm. It is to be noted that even in a case where there are a plurality of optimal solutions, the maximum value of the object function is uniquely determined.

Next, a description is given concerning operations of the parameter setting unit 12 of the parameter determination apparatus 1.

The parameter setting unit 12 of the parameter determination apparatus 1 transmits a result received from the parameter determination unit 11 to the parameter register 311 in node 3.

[Effect]

According to the parameter determination apparatus 1 according to the present example embodiment, it is possible to raise the utilization efficiency of the network. A reason for this is that consideration is given to the time in which node 3 is not communicating, and the transmission rate is determined so that as many transmission node pairs as possible are grouped. This is due to the "transmission rate/group determination constraint conditions" being given so as to be able to perform grouping as much as possible, and to be able to calculate variables to maximize transmission rate.

Second Example Embodiment

[Configuration]

Next, a detailed description is given concerning a parameter determination apparatus according to a second example embodiment, making reference to the drawings.

The configuration of the parameter determination apparatus of the present example embodiment is similar to the configuration (FIG. 2 to FIG. 4) of the parameter determination apparatus of the first example embodiment.

In the present example embodiment, in addition to the "transmission rate/group determination constraint conditions" (1) to (4) of the first example embodiment, the following constraint condition is added.

[5] Constraint Condition 4

Expression (5) is a constraint condition that constrains the object function included in the "transmission rate/group determination constraint conditions". The left side of Expression (5) shows the total number of groups holding node 3-$i$. Meanwhile, the right of the Expression (5) shows the maximum number of rate control units 313 of node 3. According to Expression (5) it is possible to consider a case where there are few rate control units 313.

$$G_i \leq N_g (\forall i \in N) \quad (5)$$

Since other conditions are similar to the first example embodiment, a description is omitted.

[Operation]

Since operations are similar to operations (FIG. 6 to FIG. 9) of the first example embodiment, descriptions are omitted.

[Effect]

According to the parameter determination apparatus of the present example embodiment, it is possible to determine the transmission rate also in a case where there is a limit on the number of rate control units 313 of node 3. A reason for this is that it is possible to take into account a limit on the number of rate control units 313, and to determine a transmission node pair group so as to have the network utilization efficiency as high as possible.

Third Example Embodiment

[Configuration]

Next, a detailed description is given concerning a parameter determination apparatus according to a third example embodiment.

The configuration of the parameter determination apparatus of the present example embodiment is similar to the configuration (FIG. 2 to FIG. 4) of the parameter determination apparatus of the first example embodiment.

The present example embodiment adds to and modifies the "transmission rate/group determination constraint conditions" (1) to (4) of the first example embodiment, as below.

[1] Object Function

Expression (6) is an object function included in the "transmission rate/group determination constraint conditions". The transmission rate/group calculation unit 112 maximizes the object function of Expression (6). In the object function of Expression (6), a third item is added to the object function of Expression (1) of the first example embodiment. The third item of Expression (6) indicates a minimum among transmission rates assigned to all groups. By adding the third item to the object function, it is possible to have a solution with the smallest value of the transmission rate as large as possible.

$$\text{maximize} \quad \left( \sum_{i=1}^{N} \sum_{g=1}^{G} rate^{ig} * valid^{ig} \right) - \left( \sum_{i=1}^{N} \delta_1 * G_i \right) + (\delta_2 * rate_{min}) \quad (6)$$

[6] Constraint Condition 5

Expression (7) is a constraint condition that constrains the object function included in the "transmission rate/group determination constraint conditions". The left side of Expression (7) is a transmission rate given to group g of node i, and the right side of Expression (7) can have a smaller value than the left side. According to Expression (7), it is possible to obtain the minimum value of the transmission rate.

$$rate^{ig} * valid^{ig} \geq rate_{min} (\forall i \in N, \forall g \in G) \quad (7)$$

Since other conditions are similar to the first example embodiment, a description is omitted.

[Operation]

Since operations are similar to operations (FIG. 6 to FIG. 9) of the first example embodiment, descriptions are omitted.

[Effect]

According to the parameter determination apparatus 1 of the present example embodiment it is possible to improve equitability among node transmission rates, while not lowering network utilization efficiency. A reason for this is that by adding the minimum rate to the object function, within a range where the network utilization efficiency it not lowered, it is possible to have the difference between the minimum rate and the maximum rate as small as possible.

It is to be noted that the following modes are possible in the present invention.

[First Mode]

As in the parameter determination apparatus according to the first aspect described above.

[Second Mode]

The parameter determination apparatus described in the first mode, provided with a constraint condition memory that holds a constraint condition when determining the group and the transmission rate, wherein the parameter determination unit determines the group and the transmission rate so as to satisfy the constraint condition.

[Third Mode]

The parameter determination apparatus described in the second mode, wherein the constraint condition is that a sum of transmission rates assigned to all groups is made large.

[Fourth Mode]

The parameter determination apparatus described in the second mode or third mode, wherein the constraint condition, with regard to links included in the communication system, is that the sum of transmission rates assigned to all groups does not exceed the link capacity of the relevant link.

[Fifth Mode]

The parameter determination apparatus described in any one of the second mode to fourth mode, wherein the constraint condition is that the minimum value of transmission rates assigned to respective groups is greater than or equal to a prescribed value.

[Sixth Mode]

The parameter determination apparatus described in any one of the second mode to fifth mode, wherein the constraint condition is that a total number of groups is made small.

[Seventh Mode]

The parameter determination apparatus described in any one of the second mode to sixth mode, wherein the constraint condition is that a total number of groups to which respective nodes belong is less than or equal to a prescribed number.

[Eighth Mode]

The parameter determination apparatus described in any one of the second mode to seventh mode, wherein the constraint condition is that the respective node pairs included in the node pair information belong to any group without duplication.

[Ninth Mode]

As in the parameter determination method according to the second aspect described above.

[Tenth Mode]

The parameter determination method described in the ninth mode, including a step in which the parameter determination apparatus holds a constraint condition in constraint condition memory when determining the group and the transmission rate, wherein the parameter determination apparatus determines the group and the transmission rate so as to satisfy the constraint condition.

[Eleventh Mode]

The parameter determination method described in the tenth mode, wherein the constraint condition is that a sum of transmission rates assigned to all groups is made large.

[Twelfth Mode]

The parameter determination method described in the tenth mode or eleventh mode, wherein the constraint condition, with regard to links included in the communication system, is that the sum of transmission rates assigned to all groups does not exceed the link capacity of the relevant link.

[Thirteenth Mode]

The parameter determination method described in any one of the tenth mode to twelfth mode, wherein the constraint condition is that the minimum value of transmission rates assigned to respective groups is greater than or equal to a prescribed value.

[Fourteenth Mode]

The parameter determination method described in any one of the tenth mode to thirteenth mode, wherein the constraint condition is that a total number of groups is made small.

[Fifteenth Mode]

The parameter determination method described in any one of the tenth mode to fourteenth mode, wherein the constraint condition is that a total number of groups to which respective nodes belong is less than or equal to a prescribed number.

[Sixteenth Mode]

The parameter determination method described in any one of the tenth mode to fifteenth mode, wherein the constraint condition is that the respective node pairs included in the node pair information belong to any group without duplication.

[Seventeenth Mode]

As in the program according to the third aspect described above.

[Eighteenth Mode]

The program described in the seventeenth mode, executing on the computer: a process of holding a constraint condition in a storage unit when determining the group and the transmission rate, and a process of determining the group and the transmission rate so as to satisfy the constraint condition.

[Nineteenth Mode]

The program described in the eighteenth mode, wherein the constraint condition is that the sum of transmission rates assigned to all groups is made large.

[Twentieth Mode]

The program described in the eighteenth mode or nineteenth mode, wherein the constraint condition, with regard to links included in the communication system, is that a sum of transmission rates assigned to all groups does not exceed the link capacity of the relevant link.

[Twenty-First Mode]

The program described in any one of the eighteenth mode to twentieth mode, wherein the constraint condition is that the minimum value of transmission rate assigned to respective groups is greater than or equal to a prescribed value.

[Twenty-Second Mode]

The program described in any one of the eighteenth mode to twenty-first mode, wherein the constraint condition is that a total number of groups is made small.

[Twenty-Third Mode]

The program described in any one of the eighteenth mode to twenty-second mode, wherein the constraint condition is that a total number of groups to which respective nodes belong is less than or equal to a prescribed number.

[Twenty-Fourth Mode]

The program described in any one of the eighteenth mode to twenty-third mode, wherein the constraint condition is that the respective node pairs included in the node pair information belong to any group without duplication.

It is to be noted that the entire disclosed content of the abovementioned Patent Literature is incorporated herein by reference thereto. Modifications and adjustments of example embodiments are possible within the bounds of the entire disclosure (including the scope of the claims) of the present invention, and also based on fundamental technological concepts thereof. Furthermore, various combinations and selections of various disclosed elements (including respective elements of the respective claims, respective elements of the respective example embodiments, respective elements of the respective drawings, and the like) are possible within the scope of the entire disclosure of the present invention. That is, the present invention clearly includes every type of transformation and modification that a person skilled in the art can realize according to the entire disclosure including the scope of the claims and to technological concepts thereof. In particular, with regard to numerical ranges described in the present specification, arbitrary numerical values and small ranges included in the relevant ranges should be interpreted to be specifically described even where there is no particular description thereof.

REFERENCE SIGNS LIST 1 parameter determination apparatus
2 network
3-1 to 3-N node
10 input output I/F
11 parameter determination unit (determinator)
12 parameter setting unit (setter)
31 transmission control unit (controller)
32 network I/F
111 constraint condition memory
112 transmission rate/group calculation unit (calculator)
113 topology information memory 114 node information memory
115 inter-node tree information memory
311 parameter register
312-1 to 312-M transmission buffer
313-1 to 313-M rate control unit (controller)

The invention claimed is:

1. A parameter determination apparatus, comprising:
an input/output I/F configured to receive topology information representing connections between nodes included in a communication system and node pair information indicating node pairs that communicate with each other;
a constraint condition memory configured to hold a constraint condition; and
one or more processors configured to
simultaneously determine, based on said topology information and said node pair information, a group formed of 1 or more of said node pairs and a transmission rate to be assigned to said group, the group and the transmission rate being determined in order to satisfy the constraint condition, and
give notification of said group and said transmission rate to said nodes included in said communication system.

2. The parameter determination apparatus according to claim 1, wherein said constraint condition is that a sum of transmission rates assigned to all groups is made large.

3. The parameter determination apparatus according to claim 1, wherein said constraint condition, with regard to a link included in said communication system, is that the sum of transmission rates assigned to all groups does not exceed link capacity of said link.

4. The parameter determination apparatus according to claim 1, wherein said constraint condition is that the minimum value of transmission rate assigned to respective groups is greater than or equal to a prescribed value.

5. The parameter determination apparatus according to claim 1, wherein said constraint condition is that a total number of groups is made small.

6. The parameter determination apparatus according to claim 1, wherein said constraint condition is that a total number of groups to which respective nodes belong is less than or equal to a prescribed number.

7. The parameter determination apparatus according to claim 1, wherein said constraint condition is that respective node pairs included in said node pair information belong to any group without duplication.

8. A parameter determination method performed in a parameter determination apparatus, the method comprising:
receiving topology information representing connections between nodes included in a communication system and node pair information indicating node pairs that communicate with each other;
simultaneously determining, based on said topology information and said node pair information, a group formed of 1 or more of said node pairs and a transmission rate to be assigned to said group;
holding a constraint condition when determining said group and said transmission rate, said group and said transmission rate are determined in order to satisfy said constraint condition; and
giving notification of said group and said transmission rate to node(s) included in said communication system.

9. A non-transitory computer-readable recording medium storing a program, executing on a computer:
a process of receiving topology information representing connections between nodes included in a communication system and node pair information indicating node pairs that communicate with each other;
a process of simultaneously determining, based on said topology information and said node pair information, a group formed of 1 or more of said node pairs and a transmission rate to be assigned to said group;
a process of holding a constraint condition when determining said group and said transmission rate, said group and said transmission rate are determined in order to satisfy said constraint condition; and
a process of giving notification of said group and said transmission rate to node(s) included in the communication system.

10. The parameter determination method according to claim 9, wherein the constraint condition is that a sum of transmission rates assigned to all groups is made large.

11. The parameter determination method according to claim 9, wherein the constraint condition, with regard to links included in the communication system, is that the sum of transmission rates assigned to all groups does not exceed the link capacity of the relevant link.

12. The parameter determination method according to claim 9, wherein the constraint condition is that the minimum value of transmission rates assigned to respective groups is greater than or equal to a prescribed value.

13. The parameter determination method according to claim 9, wherein the constraint condition is that a total number of groups is made small.

14. The parameter determination method according to claim 9, wherein the constraint condition is that a total number of groups to which respective nodes belong is less than or equal to a prescribed number.

15. The parameter determination method according to claim 9, wherein the constraint condition is that the respective node pairs included in the node pair information belong to any group without duplication.

* * * * *